(12) United States Patent
Younes et al.

(10) Patent No.: US 11,193,421 B2
(45) Date of Patent: Dec. 7, 2021

(54) COLD RECYCLE PROCESS FOR GAS TURBINE INLET AIR COOLING

(71) Applicant: Saudi Arabian Oil Company, Dhahran (SA)

(72) Inventors: Mourad Younes, Dhahran (SA); Aadesh Harale, Dhahran (SA); Sebastien Duval, Dhahran (SA); Ghulam Shabbir, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 129 days.

(21) Appl. No.: 16/434,987

(22) Filed: Jun. 7, 2019

(65) Prior Publication Data

US 2020/0386155 A1 Dec. 10, 2020

(51) Int. Cl.
*F02C 3/34* (2006.01)
*F02C 3/30* (2006.01)
(Continued)

(52) U.S. Cl.
CPC .............. *F02C 3/34* (2013.01); *F02C 3/30* (2013.01); *F02C 7/141* (2013.01); *F02C 7/18* (2013.01)

(58) Field of Classification Search
CPC .... F02C 3/30; F02C 3/305; F02C 3/34; F02C 7/141; F05D 2260/61; F05D 2260/611; Y02E 20/18
See application file for complete search history.

(56) References Cited

U.S. PATENT DOCUMENTS

| | | | | |
|---|---|---|---|---|
| 4,271,664 A | * | 6/1981 | Earnest | F01K 23/10 60/39.181 |
| 4,434,613 A | * | 3/1984 | Stahl | F25J 3/04127 60/784 |

(Continued)

FOREIGN PATENT DOCUMENTS

| EP | 0622535 A1 | 11/1994 |
|---|---|---|
| EP | 1918014 A1 | 5/2008 |

(Continued)

OTHER PUBLICATIONS

International Search Report and Written Opinion for related PCT application PCT/US2020/036509 dated Sep. 14, 2020.

(Continued)

*Primary Examiner* — William H Rodriguez
(74) *Attorney, Agent, or Firm* — Bracewell LLP; Constance G. Rhebergen; Kevin R. Tamm

(57) ABSTRACT

Methods and systems for increasing efficiency of combustion in a turbine, methods including expanding in an expansion unit a pressurized fluid stream to form an expanded, cooled fluid stream; exchanging heat between an oxygen containing stream and the expanded, cooled fluid stream to reduce temperature of the oxygen containing stream to a reduced temperature and create a reduced temperature turbine compressor inlet oxygen containing stream; and compressing the reduced temperature turbine compressor inlet oxygen containing stream to an operating pressure of the turbine, where the step of compressing the reduced temperature turbine compressor inlet oxygen containing stream is more efficient than compressing the oxygen containing stream.

16 Claims, 4 Drawing Sheets

(51) Int. Cl.
*F02C 7/141* (2006.01)
*F02C 7/18* (2006.01)

(56) References Cited

U.S. PATENT DOCUMENTS

| | | | |
|---|---|---|---|
| 5,724,805 | A | 3/1998 | Golomb et al. |
| 7,827,778 | B2 | 11/2010 | Finkenrath et al. |
| 8,051,638 | B2 | 11/2011 | Aljabari et al. |
| 8,220,247 | B2 | 7/2012 | Wijmans et al. |
| 8,327,647 | B2 | 12/2012 | Guidati et al. |
| 8,408,006 | B2 | 4/2013 | Li et al. |
| 8,424,282 | B2 | 4/2013 | Vollmer et al. |
| 9,410,481 | B2 | 8/2016 | Palmer et al. |
| 9,670,841 | B2 | 6/2017 | Mittricker et al. |
| 9,919,268 | B2 | 3/2018 | Allam et al. |
| 10,018,115 | B2 | 7/2018 | Allam et al. |
| 10,047,673 | B2 | 8/2018 | Allam et al. |
| 2002/0023423 | A1* | 2/2002 | Viteri ............... F02C 1/007 60/772 |
| 2006/0272331 | A1* | 12/2006 | Bucker ............... F02C 6/18 60/774 |
| 2007/0034171 | A1* | 2/2007 | Griffin ............... F01K 23/10 122/479.1 |
| 2008/0010967 | A1* | 1/2008 | Griffin ............... F02C 3/34 60/39.182 |
| 2008/0083226 | A1* | 4/2008 | Joshi ............... F02C 3/34 60/772 |
| 2009/0107141 | A1* | 4/2009 | Chillar ............... F02C 1/08 60/605.2 |
| 2010/0101545 | A1* | 4/2010 | Draper ............... F02C 3/34 123/568.12 |
| 2012/0023892 | A1 | 2/2012 | Kulkarni et al. |
| 2012/0023960 | A1* | 2/2012 | Minto ............... F02C 3/34 60/772 |
| 2012/0186268 | A1* | 7/2012 | Rofka ............... F02C 3/34 60/783 |
| 2013/0047576 | A1* | 2/2013 | Sander ............... F02C 3/34 60/39.182 |
| 2013/0145773 | A1* | 6/2013 | Kulkarni ............... F02C 3/34 60/783 |
| 2013/0174535 | A1* | 7/2013 | Van Straaten ............... F02C 6/18 60/269 |
| 2013/0269362 | A1* | 10/2013 | Wichmann ............... F02C 3/34 60/773 |
| 2014/0000271 | A1* | 1/2014 | Mittricker ............... F02C 3/30 60/772 |
| 2014/0020398 | A1* | 1/2014 | Mittricker ............... F02C 3/34 60/772 |
| 2014/0083109 | A1* | 3/2014 | Oelfke ............... F02C 6/18 60/772 |
| 2014/0116023 | A1* | 5/2014 | Anand ............... F02C 3/30 60/39.52 |
| 2014/0150402 | A1* | 6/2014 | ElKady ............... F23J 15/022 60/39.52 |
| 2014/0250908 | A1* | 9/2014 | Huntington ............... F02C 3/20 60/776 |
| 2014/0250911 | A1* | 9/2014 | Huntington ............... F01K 5/02 60/780 |
| 2015/0000296 | A1* | 1/2015 | Guethe ............... F02C 3/34 60/772 |
| 2015/0007579 | A1* | 1/2015 | Curran ............... F01N 3/0857 60/772 |
| 2015/0114338 | A1* | 4/2015 | Feinstein ............... F02C 7/10 123/25 A |
| 2015/0376801 | A1 | 12/2015 | Bairamijamal |
| 2017/0306844 | A1 | 10/2017 | Forrest et al. |
| 2018/0073430 | A1 | 3/2018 | Forrest et al. |

FOREIGN PATENT DOCUMENTS

| | | |
|---|---|---|
| WO | 9967519 | 12/1999 |
| WO | 2005071244 A1 | 8/2005 |

OTHER PUBLICATIONS

Al-Ansary, H. et al; Impact of the Use of a Hybrid Turbine Inlet Air Cooling System in Arid Climates, Energy Conversion and Management,I vol. 75 (2013) pp. 214-223.

Baakeem, S. et al,; Performance Improvement of Gas Turbine Power Plants by Utilizing Turbine inlet Air-cooling technologies in Riyadh, Saudi Arabia, Applied Thermal Engineering, vol. 138, Jun. 25, 2018, pp. 417-432.

Baker, et al., "CO2 Capture from natural gas power plants using selective exhaust gas recycle membrane designs," International Journal of Greenhouse Gas Control, 66, 2017, pp. 35-47.

Elkady, A.M. et al, Applicaiton of Exhaust Gas Recirculation in DLN F-Class Combustion System for Postcombustion Carbon Capture, Journal of Engineering for Gas Turbines and Power, vol. 131 (May 2009) p. 34505-1-34505-6.

Herraiz Palomino, L, "Selective Exhaust Gas Recirculation in Combined Cycle Gas Turbine Power Plants with Post-Combustion Carbon Capture," The University of Edinburgh, 2016, pp. 1-241.

Jansohn, et al. "Technologies for Gas Turbine Power Generation with CO2 Mitigation," Science Direct, Energy Procedia, 4, 2011, pp. 1901-1908.

* cited by examiner

COLD RECYCLE PROCESS FOR GAS TURBINE INLET AIR COOLING

BACKGROUND

Field

The present disclosure relates to recirculating or recycling expanded, cooled fluid streams toward a turbine air compressor inlet to cool inlet air entering a turbine compressor. More specifically, the present disclosure relates to recycling expanded, cooled $CO_2$-rich fluid streams from a carbon capture system toward the air compressor inlet of a gas turbine to cool and lower the temperature of the inlet air, to reduce overall inlet air temperature, reduce emissions, and increase the power output and efficiency of the turbine.

Description of the Related Art

Turbines for power production using fossil fuels typically include an inlet air compressor, a combustion chamber with a fossil fuel inlet, at least one turbine, and a heat recovery steam generator or "HRSG," when operated in multi-generation or combined cycle modes. Fuels for such turbines can include natural gas, synthetic fuels, and oil or oil derivatives, for example. The operation and efficiency of turbines is affected by a variety of factors, including fuel type, composition of inlet air for combustion with the fuel, air intake to fuel ratio, and the temperature of the intake air.

In recent years, carbon capture and sequestration technology to control the emission of carbon dioxide ("$CO_2$") from such fossil fuel powered turbines has been advancing. Such carbon capture systems can include absorption towers with solvents, adsorption materials, membrane materials, cryogenic separation, and others.

Gas turbine power output and efficiency are very sensitive to altitude and ambient air inlet conditions such as temperature. Power output can degrade beyond 15% when ambient air temperature increases to about 40° C. from ISO conditions, or increases upward from about 15° C. Present options to mitigate the negative effects of arid and high temperature climates include technologies ranging from passive systems, such as media evaporative cooling systems and high pressure fogging systems, to active refrigeration systems, such as mechanical vapor compression systems or absorption refrigeration systems.

Prior art power production systems producing $CO_2$, in addition to or alternative to other gases which can be captured or sequestered and compressed, do not efficiently integrate with carbon dioxide, or other gas, capture and recycle technologies for the benefit of the power production systems. High pressure fluid streams are not efficiently used in cooling mechanisms.

SUMMARY

Applicant has recognized that there is a need for efficient use of captured or otherwise available fluids, for example compressed $CO_2$ gas, for expansion and subsequent temperature control of turbine inlet air for efficient power production. The disclosure presents apparatus, methods, and systems applying fluid expansion in addition to or alternative fluid recirculation or recycle which show effective, surprising, and unexpected effects on turbine power production and efficiency. In certain embodiments, by expanding a compressed $CO_2$-rich fluid stream from a carbon capture plant or other carbon dioxide source and mixing it with turbine inlet air, reducing the overall compressor inlet air temperature increases compressor and turbine efficiency, and reduces emissions. The ratio of a cooled, expanded fluid, for example a recycled $CO_2$-rich gas stream, to inlet air, or any inlet stream comprising oxygen, can be calculated to optimize gas turbine performance, in part by reducing energy required by an inlet air compressor, in addition to or alternative to maximize the power output depending on the turbine application, either as a mechanical drive or to generate power to meet the grid demand.

Embodiments relate to system and process configurations allowing cooling of gas turbine inlet air using recycled, expanded, cooled $CO_2$, in addition to or alternative to other fluid streams. Certain embodiments apply the cooling effect of expanding high pressure fluids (such as gases) in order to reduce inlet air temperature of a gas turbine, specifically an inlet air compressor of a gas turbine. By mixing incoming ambient air with expanded, cooled gases (such as $CO_2$, $N_2$, in addition to or alternative to water), the inlet temperature of air to a compressor and combustion chamber of a gas turbine is reduced, increasing efficiency. One option for an expanded, cooled fluid stream is pure or substantially pure $CO_2$, for example greater than about 80 mol. %, about 90 mol. %, or about 95 mol. % $CO_2$. Embodiments here show the use of $CO_2$ to cool inlet air temperatures both by expansion of high pressure $CO_2$ and by selective exhaust gas recirculation applications, both of which are aimed at improving the performance of gas turbines. $CO_2$ is widely available from processes as a byproduct or as a product itself, as for example the case of power plants with $CO_2$ capture systems or gas plants.

In one embodiment for example, a $CO_2$ stream is expanded from about 5 bar to about ambient pressure and it is subsequently mixed with an inlet air stream to a compressor at a molar ratio of about 1:10, and this yields about a 5 Kelvin (K) temperature decrease to increase the turbine efficiency by about 0.5%. At a lower inlet temperature, the turbine compressor requires less energy to compress the air for combustion in the turbine.

Selective $CO_2$ recycle using $CO_2$ as a compressed then expanded fluid provides flexibility compared to exhaust gas recirculation alone, as $CO_2$ recycle allows higher recirculation ratios while maintaining the $O_2$ level above the level required for a stable combustion, generally above 15 or 16 mol. %. $CO_2$ concentration in the total mixture at the compressor inlet can range between about 0 and about 30 mol. %, in some embodiments between about 2 and about 20 mol. % when operating with ambient air. In oxy-combustion cases where the oxidizing stream is high concentration oxygen (typically above 90 mol. %), $CO_2$ concentration can be between about 0 and about 85 mol. % in the total mixture, in some embodiments between about 60 and about 80 mol. %.

Certain embodiments of systems and processes integrate positive effects of selective gas recirculation and inlet air cooling in a single system leading to optimized operation of one or more gas turbines.

In some embodiments, systems and processes allow for efficient usage of liquid $CO_2$ byproduct by using direct contact heat transfer and integration with the gas turbine. A high pressure fluid stream, for example comprising $CO_2$, can be expanded through an expansion valve in addition to or alternative to a turbine or other pressure reduction means reducing its temperature to well below ambient conditions. The expanded, cooled stream is then used to exchange heat indirectly with the gas turbine inlet air stream to cool it down, or more preferably mixed directly and intimately with the incoming air to reduce temperature. In another alternative embodiment, the expanded, cooled stream is split between exchanging heat indirectly with the gas turbine inlet air stream, and directly and intimately mixing with the incoming air stream to reduce its temperature.

With direct mixing between turbine compressor inlet air and an expanded, cooled fluid stream, for example comprising $CO_2$, the expanded, cooled fluid stream can be expanded to different pressure levels and mixed with the inlet air at different stages of the gas turbine compressor to optimize the overall operation of the gas turbine. For example, when the gas turbine is equipped with intercooling, the expanded, cooled fluid stream can be expanded to feed and cool a low pressure compressor inlet air stream and/or a high pressure compressor inlet air stream, downstream of the intercooler.

Systems and processes can be operated all year long, with gases expanded to lesser pressures (for example ambient pressure or in the range of about 1 to 2 bar) during summer and to greater pressures (for example about 2 to 5 bar) during winter to avoid freezing if water vapor content in the high pressure $CO_2$ stream is high enough to freeze when the stream is expanded to low pressure and sub-zero temperatures. In other embodiments, the expansion system can include isentropic expansion devices, such as turbines, operating in parallel or series with isenthalpic expansion systems, such as expansion valves. In such a configuration, expanding a high pressure stream to ambient pressure and avoiding freezing is possible by regulating how much of the flow is sent to isentropic expanders and how much of the flow is going through isenthalpic expansion valves. Sub-zero temperatures can be avoided when water content in the $CO_2$ stream is high enough to cause water freezing when expanded to low pressure and temperature, otherwise, higher purity $CO_2$ streams without significant water vapor can be cooled to below 0° C.

As an example, expanding a 5 bar $CO_2$ stream at 50° C. to 1 bar through an isentropic turbine would yield a low pressure stream temperature around −23° C., while an isenthalpic expansion of the same stream would yield a low pressure stream temperature around 46° C. Calculating the portion of the mass flow rate that goes into an isentropic versus isenthalpic expander is possible in such a way that the combination of two low pressure (expanded) streams allows a combined stream temperature above 0° C., if necessary to avoid water freezing. In a configuration where the isentropic expansion is operated in series with an isenthalpic expansion, it is possible to expand the $CO_2$ stream at 5 bar and 50° C. to 2 bar with a resultant temperature of 6° C. and then expand further the intermediate pressure stream from 2 bar to 1 bar through an expansion valve to reach 1 bar pressure and 5° C. temperature, well above water's freezing temperature. In some operation schemes, systems and methods can be used only at peak power requirement times for supplemental power production if the high pressure fluid stream is costly or more valuable as a product, instead of ambient air inlet cooling means.

Embodiments of the disclosure allow for internal usage or external usage of high pressure $CO_2$ streams in supercritical $CO_2$ cycles, such as an Allam cycle, for example. High pressure streams include a compression cost; however, surprisingly and unexpectedly the efficiencies of cooling inlet air to a turbine can offset or recover the costs, and in certain embodiments, only a slip stream is needed to achieve the desired efficiency outcome. Gas turbine compressors use multi-stage (above 10 stages, regularly 14 stages for large frames and even a higher number for higher pressure) compressors with some designs having an intercooling stage between a series of compression stages (usually called low pressure compression stages) and a second series of compression stages (called high pressure) to increase the efficiency of the system. Expanding a $CO_2$ mixture to ambient pressure is possible to feed the low pressure stages and/or expand it to various pressures to feed for example the low pressure stages and high pressure stages when an intercooler is available. For example, a compressor housing can have positioned nozzles at some of the inter-stages to accept the expanded $CO_2$ at various compression levels, as for example one set of nozzles after the first or second compression stage and another set of nozzles at the third or fourth compression stage.

For example, in some embodiments where $CO_2$ is recovered and compressed for enhanced oil recovery ("EOR") operations, a slip stream or a stream from the compressed $CO_2$ can be expanded and fed to one or more gas turbine inlet air stream(s) to cool the inlet air and increase efficiency of the one or more gas turbines. Other embodiments integrate selective exhaust gas recirculation along with expanded, cooled fluid turbine inlet air cooling with the aim to synergistically increase the benefits of the two technologies. Embodiments disclosed maintain or reduce gas turbine emissions (for example NOx emissions) compared to prior art systems.

Some embodiments benefit from harvesting unused heat in simple cycle gas turbines or mechanical drives to provide the required energy to regenerate the $CO_2$-capturing solvent used in an absorption system, or $CO_2$-capturing sorbent used in an adsorption system, to provide high purity $CO_2$.

Therefore, disclosed here is a method for increasing power from or efficiency of combustion in a turbine, the method including expanding in an expansion unit a pressurized fluid stream to form an expanded, cooled fluid stream; exchanging heat between an oxygen containing stream and the expanded, cooled fluid stream to reduce temperature of the oxygen containing stream to a reduced temperature and create a reduced temperature turbine compressor inlet oxygen containing stream; and compressing the reduced temperature turbine compressor inlet oxygen containing stream to an operating pressure of the turbine, where the step of compressing the reduced temperature turbine compressor inlet oxygen containing stream is more efficient than compressing the oxygen containing stream.

In some embodiments, the method includes the step of combusting a fuel in a combustion chamber of the turbine using the reduced temperature turbine compressor inlet oxygen containing stream, where the step of combusting the fuel with the reduced temperature turbine compressor inlet oxygen containing stream is more efficient than combusting the fuel in the combustion chamber with the oxygen containing stream. In some embodiments, emissions, including nitrogen oxides emissions, of the turbine are reduced compared to combusting the fuel in the combustion chamber with the oxygen containing stream. Still in other embodiments, the oxygen containing stream comprises air. In certain embodiments, the oxygen containing stream comprises an oxygen enriched stream produced from an air separation unit. Still in other embodiments, the expansion unit comprises an expansion valve.

Still in other embodiments, the expansion unit comprises a turbine. In certain embodiments of the method, the step of expanding comprises operating a turbine and an expansion valve in a series configuration. In yet other embodiments, the step of expanding comprises operating a turbine and an expansion valve in a parallel configuration. In certain embodiments, the pressurized fluid stream comprises compressed $CO_2$. In further embodiments, the compressed $CO_2$ is provided from a carbon capture process capturing carbon dioxide produced in a step of combusting a fuel in a combustion chamber of the turbine. In certain embodiments of the method, the compressed $CO_2$ is cooled before the step of expanding in the expansion unit.

Still in other embodiments, the method includes the steps of compressing a slip stream of $CO_2$ rich solvent from a first pressure to a second pressure in a carbon capture system, the second pressure being greater than the first pressure, and regenerating at the second pressure $CO_2$ to produce the compressed $CO_2$. In certain embodiments, the compressed $CO_2$ is provided from a source selected from a group comprising: a carbon capture process capturing carbon dioxide produced in a step of combusting a fuel in a combustion chamber of the turbine; a hydrocarbon-bearing reservoir; a natural gas treatment plant; a $CO_2$ capture plant comprising $CO_2$ from combustion products; a $CO_2$ capture plant comprising $CO_2$ from air; an industrial process providing $CO_2$ byproduct; or a combination of any of the foregoing.

Still in other embodiments, the step of exchanging heat between the oxygen containing stream and the expanded, cooled fluid stream is carried out with direct mixing between the oxygen containing stream and the expanded, cooled fluid stream. In further embodiments, the step of exchanging heat between the oxygen containing stream and the expanded, cooled fluid stream is carried out with indirect heat exchange between the oxygen containing stream and the expanded, cooled fluid stream.

In yet other embodiments, the oxygen containing stream is between about 30° C. and about 60° C., the reduced temperature turbine compressor inlet oxygen containing stream is between about 5° C. and about 45° C., and the oxygen level in the reduced temperature turbine compressor inlet oxygen containing stream is maintained at least at about 15 mol. %. Still in other embodiments, the method includes the step of applying selective exhaust gas recirculation to at least a portion of exhaust gas produced from the step of combusting the fuel in the combustion chamber of the turbine to recirculate exhaust gas to the oxygen containing stream. In yet other embodiments of the method, the step of exchanging heat between the oxygen containing stream and the expanded, cooled fluid stream and the step of applying selective exhaust gas recirculation to exhaust gas are performed simultaneously.

In some embodiments, the method includes the step of increasing the volume amount of the expanded, cooled fluid stream based on temperature of the oxygen containing stream. Still in other embodiments, the method includes the step of decreasing the volume amount of the expanded, cooled fluid stream based on temperature of the oxygen containing stream. Still in other embodiments, the expanded, cooled fluid stream is at least about 90 mol. % $CO_2$ and is at about 1 bar pressure.

Additionally disclosed here is a system for increasing power from or efficiency of combustion in a turbine, the system including a turbine unit with an oxygen containing stream inlet, the turbine unit operable to combust a fossil fuel and produce $CO_2$ exhaust; a carbon capture unit fluidly coupled to the turbine unit, the carbon capture unit operable to capture at least a portion of the $CO_2$ exhaust and produce a pressurized $CO_2$ stream with an increased concentration of $CO_2$ and increased pressure relative to the $CO_2$ exhaust; an expansion unit fluidly coupled to the carbon capture unit and operable to reduce the pressure of the pressurized $CO_2$ stream to form an expanded, cooled fluid stream; and a heat exchange unit fluidly coupled to the expansion unit and the turbine unit, and operable to exchange heat between an oxygen containing stream and the expanded, cooled fluid stream to reduce temperature of the oxygen containing stream to a reduced temperature and create a reduced temperature oxygen containing stream for use in the turbine oxygen containing stream inlet.

In some embodiments of the system, the turbine unit comprises a gas turbine. Still in other embodiments, the carbon capture unit comprises at least two differently-sized regeneration units for regenerating $CO_2$-capturing solvent, where at least one of the two differently sized regeneration units produces the pressurized $CO_2$ stream at between about 1.5 bar and about 15 bar. In other embodiments, the carbon capture unit comprises two at least two differently-sized regeneration units for regenerating $CO_2$-capturing solvent, where at least one of the two differently sized regeneration units produces the pressurized $CO_2$ stream at between about 3 bar and about 7 bar. Still in other embodiments, the expansion unit comprises an expansion valve. In some embodiments, the expansion unit comprises a turbine. In yet other embodiments, the expansion unit comprises a turbine and an expansion valve in series.

Still in certain other embodiments, the expansion unit comprises a turbine and an expansion valve in parallel. In certain other embodiments, the heat exchange unit allows direct mixing between the oxygen containing stream and the expanded, cooled fluid stream. Still in other embodiments, the heat exchange unit allows indirect heat exchange between the oxygen containing stream and the expanded, cooled fluid stream. In yet other embodiments, the turbine is operable when the oxygen containing stream is between about 30° C. and about 60° C., the reduced temperature oxygen containing stream is between about 5° C. and about 45° C., where oxygen level in the reduced temperature oxygen containing stream is maintained at least at about 15 mol. %, and where the turbine is more efficient with the reduced temperature oxygen containing stream than with the oxygen containing stream.

In yet other embodiments, the system includes a selective $CO_2$ transfer unit for selective exhaust gas recirculation of at least a portion of the $CO_2$ exhaust produced in the turbine unit, to recirculate exhaust gas to the oxygen containing stream. Still in other embodiments, the system includes a selective $CO_2$ transfer unit for selective exhaust gas recirculation of at least a portion of the $CO_2$ exhaust produced in the turbine unit, to recirculate exhaust gas, where $CO_2$ exhaust to the selective $CO_2$ transfer unit has passed through an absorption column of the carbon capture unit for purification. In some embodiments, the system is operable to simultaneously cool the oxygen containing stream using the expansion unit and the selective $CO_2$ transfer unit. In some other embodiments, the system is operable to increase the volume amount of the expanded, cooled fluid stream based on temperature of the oxygen containing stream. Still in other embodiments, the system is operable to decrease the volume amount of the expanded, cooled fluid stream based on temperature of the oxygen containing stream. In certain other embodiments, the expanded, cooled fluid stream is at least about 90 mol. % $CO_2$ and is at about 1 bar pressure. In certain embodiments of the systems and methods, the expanded, cooled fluid stream is formed solely from expansion based on energy provided by the system intrinsically during compression from the carbon capture unit.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of apparatus, methods, and systems applying fluid expansion and recycle, in addition to or alternative to selective exhaust gas recirculation, which show efficient, surprising, and unexpected effects on turbine power production efficiency, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
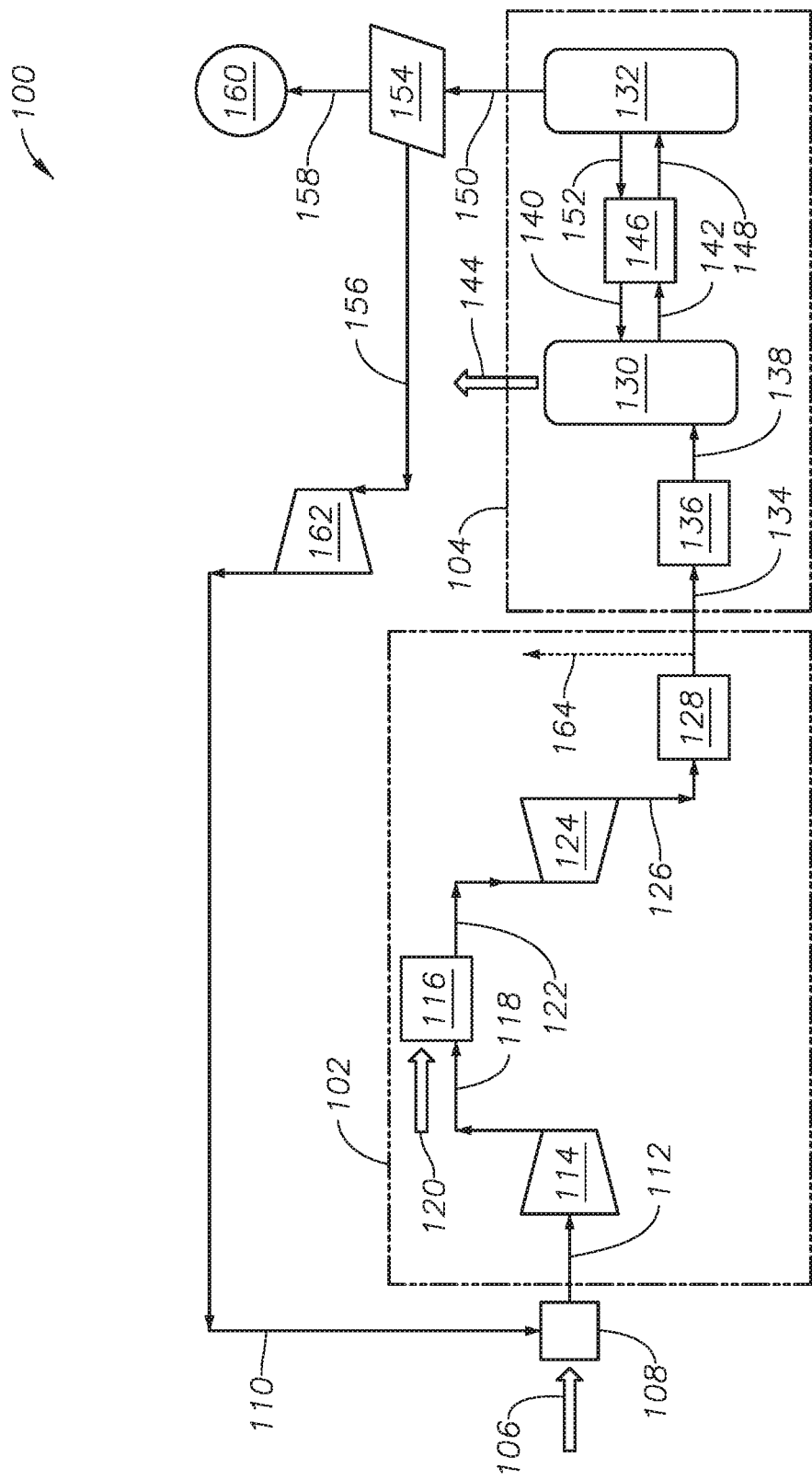
FIG. 1 is a schematic for a system exhibiting expanded, cooled fluid recycle to control inlet air temperature in a gas turbine, where the system includes a single column $CO_2$ absorption system.

FIG. 1 is a schematic for a system exhibiting expanded, cooled fluid recycle to control inlet air temperature in a gas turbine, where the system includes a single column $CO_2$ absorption system. In integrated turbine and carbon capture system 100, turbine system 102 and carbon capture system 104 operate together to synergistically increase the performance of turbine system 102 via control of the temperature of inlet air or an inlet oxidizing stream, for example a stream containing above 90 mol. % $O_2$.

An oxygen rich stream, external air, or a combination thereof for example at ambient outdoor conditions varying with seasonal temperatures, is fed through external air stream 106 into a heat exchange unit 108 where it exchanges heat with and is cooled by an expanded, cooled fluid stream 110. Heat exchange unit 108 can directly mix and comingle external air stream 106 and cooled fluid stream 110, and/or heat exchange unit 108 can indirectly allow for heat exchange between external air stream 106 and expanded, cooled fluid stream 110 to cool external air stream 106. Expanded, cooled fluid stream 110 includes in some embodiments a $CO_2$-rich gas stream. A cooled intermediate temperature stream 112 results from the mixing of external air and expanded, cooled fluid from stream 110 in heat exchange unit 108, for example an air mixing chamber, and cooled intermediate temperature stream 112 is fed to inlet compressor 114 of the turbine system 102. Mixed, cooled air from cooled intermediate temperature stream 112 is compressed in inlet compressor 114 before entering combustion chamber 116 via stream 118 where it oxidizes or combusts the fuel fed through fuel inlet 120.

Resulting exhaust gases from combustion chamber 116 exit via combustion exhaust stream 122 and expand in turbine 124 to about ambient pressure. Low pressure exhaust gases are conveyed through stream 126 to a waste heat recovery system 128, which includes a heat recovery steam generator to recover the remaining energy and generate steam, which is generally used as utility or expanded to generate power.

In some embodiments, temperature of stream 110 can range between about −76° C. and about 40° C., and in some embodiments between about 0° C. and about 30° C. Stream 112 temperature can be between about 2 K to 40 K below stream 106 temperature, and preferably being about 5 K to about 15 K below stream 106 temperature. Depending on turbine size and configuration, a decrease in stream 112 temperature of 10 K can yield efficiency increase above 1% for turbine system 102. Compression energy required decreases as colder air is compressed, and thus the overall efficiency of the system increases.

In certain embodiments, turbine system 102 includes a gas turbine, and fuel inlet 120 accepts natural gas. In some embodiments, other fossil fuels such as synthetic fuels, oils, and oil derivatives can be used in a turbine system. In turbine system 102, the system can incorporate one or more different types of gas turbines such as heavy-duty, industrial, or aero-derivative gas turbines. A gas turbine can be designed to operate in a simple cycle, in multi-generation, or in a combined cycle, and can be used either for mechanical drive applications or power generation.

In embodiments of turbine system 102 where a gas turbine is operated in a simple cycle or as a mechanical drive, waste heat recovery system 128 can be applied in turbine system 102, as it is generally part of a combined cycle configuration or multi-generation configuration. In other embodiments, a waste heat recovery system is not required. One of ordinary skill understands different configurations for and different uses of turbine systems, such as turbine system 102.

Carbon capture system 104 represents an example of a solvent based post-combustion $CO_2$ capture system comprising an absorption tower 130 and a $CO_2$ solvent regenerator 132, for example a stripper column. Carbon capture system 104 can incorporate in different embodiments any suitable $CO_2$ solvent, such as for example amine-based solvents or ionic liquids. In some embodiments, carbon capture systems, such as carbon capture system 104, can include adsorption-based $CO_2$ capture units, such as temperature or pressure swing adsorption units, or cryogenic $CO_2$ separation, and membrane-based separation units. A person of ordinary skill will realize that a variety of carbon capture technologies exist for incorporation into carbon capture systems.

Stream 134 exits waste heat recovery system 128 and is fed to an exhaust conditioning unit 136 before entering the absorption tower 130 via stream 138. Exhaust conditioning unit 136 in the embodiment shown includes a water quench and polishing step, which allow the exhaust gases to meet the requirements of the carbon capture system 104, in particular for this example the absorption tower 130 and the $CO_2$-absorbing solvent. In FIG. 1, 100% of stream 134 exiting waste heat recovery system 128 is sent to carbon capture system 104. In other embodiments where $CO_2$ capture/sequestration is not required beyond internal usage for inlet air cooling, an optional split stream 164 from stream 134 would be vented rather than all exhaust being fed to carbon capture system 104 to reduce energy usage of carbon capture system 104.

Absorption tower 130 is fed a $CO_2$-lean solvent via stream 140 that is contacted with exhaust gas in absorption tower 130, where the exhaust gas exits exhaust conditioning unit 136 via stream 138 and is input into absorption tower 130 for mixing with the $CO_2$-lean solvent stream. Carbon dioxide is absorbed by the $CO_2$-lean solvent and exits absorption tower 130 via a $CO_2$-rich solvent stream 142. $CO_2$ capture rate is partly a function of the design of absorption tower 130 and what solvent or combination of solvents is used. In some embodiments, about 90% of the $CO_2$ from stream 138 is captured.

$CO_2$-lean exhaust gases are vented out of absorption tower 130 through stream 144. The $CO_2$-rich solvent stream 142 in some embodiments is compressed by a pump and circulated through internal heat exchangers 146 where it is heated before its introduction into the $CO_2$ solvent regenerator 132 via stream 148. Heat is applied to the $CO_2$ solvent regenerator 132, and $CO_2$ is desorbed from the $CO_2$-rich solvent to exit $CO_2$ solvent regenerator 132 via stream 150. Heated $CO_2$-lean solvent is conveyed out of $CO_2$ solvent regenerator 132 via line 152 and through internal heat exchangers 146 before $CO_2$-lean solvent is recycled and fed again to the absorption tower 130 via stream 140.

Stream 150 is mostly composed of $CO_2$ saturated with water vapor when it leaves $CO_2$ solvent regenerator 132. As for example, in amine-based solvent regeneration units, the $CO_2$ and water vapor stream leaves the regenerator at a pressure of about 2 bar (about 1 to 5 bar range), a temperature of about 120° C., and a water vapor content that can be above 50 mol %. Regeneration columns include heat exchangers to cool down the temperature of the exiting stream close to a cold sink temperature to condense water and knock it out of the stream for recirculation back in the solvent loop. In the case where $CO_2$ capture system 104 provides a $CO_2$ rich stream 150 at temperatures above an ambient sink temperature, a heat exchanger can be incorporated in the system to exchange heat with the ambient sink and cool down stream 150 to near ambient temperatures. The remaining gaseous stream then is a highly concentrated $CO_2$ stream (typically above 90 mol. %) saturated with some water vapor. In another example using a methanol based absorption system, stream 150 would be at pressures between about 2 to 10 bar and temperatures between about −50 to −30° C.

Stream 150 is fed to controller 154, which regulates the amount of $CO_2$-rich stream to be recycled to turbine system 102 via streams 156 and 110. $CO_2$ is split between streams 156 and stream 158. Remaining $CO_2$ exits controller 154 via stream 158 to $CO_2$ dehydration and compression station 160. Depending on the water vapor content in stream 156 along with stream 156 pressure and temperature, in some embodiments stream 156 is cooled and dehydrated before expansion to avoid water frost formation after expansion. Operating temperatures and pressures of different $CO_2$ capture systems and $CO_2$ streams exiting these systems are well known to persons having ordinary skill in the art, and therefore the design of controller 154, the requirements for further treatment of stream 156 before entering the expansion unit 162, and the design of the expansion unit 162 would be based, in part, on the composition, temperature, and pressure of stream 150.

$CO_2$ enters an expansion unit 162 where it is expanded and cooled below ambient air temperature, or below the temperature of an oxidation stream to a turbine compressor inlet. $CO_2$, in addition to or alternative to other fluids such as for example water vapor, are expanded in expansion unit 162, and are therefore cooled in temperature. Expanded, cooled fluid stream 110 is recycled to heat exchange unit 108. Expansion unit 162 in some embodiments comprises one or more turbines of any suitable type; in another embodiment, it can comprise one or more nozzles or expansion valves, optionally in series with one or more turbines. The amount and temperature of recirculated fluids, such as $CO_2$-rich gases, in streams 110, 156 are controlled to optimize the operation of turbine system 102 depending on the ambient temperature of external air stream 106. If for example external air stream 106 is at a greater temperature, a greater recirculation rate is used, while still keeping the $O_2$ content in the combustion chamber 116 above about 16 or 17 mol. % to prevent flame instabilities and poor combustion performance.

In an example, stream 110 temperature can be in a range between about −76° C. and 40° C., and in some embodiments between about 0° C. and 30° C. Stream 112 temperature can be about 2 K to about 40 K below stream 106 temperature and preferably being 5 K to 15 K below stream 106 temperature.

As noted, in other embodiments where $CO_2$ capture is not required beyond internal usage for inlet air cooling, an optional split stream 164 from stream 134 would be vented rather than all exhaust being fed to carbon capture system 104. Captured $CO_2$ in carbon capture system 104 would then be conveyed through stream 156 to the expansion unit 162; in such a configuration, carbon capture system 104 would be smaller and optimized for the specific purpose of inlet air cooling, rather than capturing all $CO_2$ produced by a turbine system.

Carbon capture system 104 can be designed to capture and recirculate only $CO_2$ required to cool external air stream 106, when there is no requirement to reduce the emissions from a power plant generally. In such an embodiment $CO_2$ dehydration and compression station 160 would not be required. In such an embodiment, control of the system is performed in part by controlling the amount of flue gas entering the $CO_2$ capture system through stream 134, and in part using the $CO_2$ solvent regenerator 132 column reboiler duty. Increasing the reboiler duty can increase solvent regeneration and therefore the recoverable $CO_2$ from the $CO_2$ solvent, while reducing the reboiler duty would reduce the recoverable $CO_2$ from the solvent.

In other embodiments, stream 134 entering carbon capture system 104 can include $CO_2$ from one or more external $CO_2$ sources (other than turbine system 102), such as for example another gas turbine, a boiler, a gas plant, or subterranean $CO_2$ storage. In some embodiments, carbon capture system 104 is an external system that is providing at its battery limits stream 156, comprising $CO_2$, feeding the expansion unit 162. $CO_2$ provided through stream 156 can be in a gaseous state, a liquid state, a two-phase state, or a supercritical state. Expansion unit 162 is selected from commercially-available technologies based upon, in part, maintaining appropriate pressure levels, pressure ratio, and physical state of the $CO_2$ streams at the inlet and outlet of the device. In one example embodiment, stream 156 can include a liquid $CO_2$ stream or a supercritical $CO_2$ stream feeding an expansion valve in expansion unit 162. In other example embodiments, stream 156 can include a gaseous $CO_2$ stream or supercritical $CO_2$ stream feeding a turbine in expansion unit 162.

An external system providing $CO_2$ at its battery limits can be a $CO_2$ capture system in a gas plant or in a power plant, or can be a chemical process with $CO_2$ as a byproduct such as ethylene glycol plants or reforming plants with hydrogen membrane separation, or can be $CO_2$ recovered from acid gas enrichment plants. In other instances, $CO_2$ can be produced from subterranean $CO_2$ storage and hydrocarbon-bearing reservoirs.

In some embodiments, systems use $CO_2$ that is captured in gas plants from $CO_2$ removal from natural gas inlet streams for meeting the inlet quality requirements for the natural gas streams. In such cases, the $CO_2$ is generally captured by absorption systems operating at high pressure, and therefore $CO_2$ is initially at higher pressure when compared to $CO_2$ captured from exhaust gases. If $CO_2$ pressure exiting the $CO_2$ solvent regenerator 132 is not sufficient to provide the necessary cooling, in some embodiments a smaller regenerator is installed that is operated specifically at higher pressure to meet the cooling requirements as is the case described further with regard to FIG. 2.

Raw natural gas is usually processed in gas plants at elevated pressures (for example about 10 to about 100 bar) compared to power plant flue gases operating around atmospheric pressure. In some embodiments $CO_2$ solvent can be regenerated in a reboiler at higher pressure compared to the classical regeneration scheme in order to collect the $CO_2$ at higher pressure. In such a setup, the steam required for the regeneration is at higher pressure compared to the classical regeneration scheme.

Stream 156, which can be provided by an external $CO_2$ system described previously in addition to or alternative to $CO_2$ exiting $CO_2$ solvent regenerator 132, in some embodiments has a pressure between about 1.5 bar and about 200 bar, or between about 1.5 bar and about 15 bar, or between about 3 bar and about 7 bar. In an embodiment where amine-based solvent is used for the capture of $CO_2$, the pressure in regenerator 132 would range between about 1 and 5 bar, and typically be about 3 bar. In one embodiment, $CO_2$ is collected from one or more carbon capture systems, such as carbon capture system 104, and is expanded in a single turbine of expansion unit 162 to about 1 bar. In some embodiments, the $CO_2$ is then distributed to separate or more than one turbine systems, such as for example turbine system 102, working in parallel, and in other embodiments recirculated $CO_2$ can be distributed to dedicated smaller turbines of expansion unit 162 before feeding a corresponding gas turbine mixing chamber, such as for example heat exchange unit 108. In such cases, the carbon capture system is sized and designed specifically for this application.

In some embodiments, expanded, cooled fluid stream 110 is cooled entirely or substantially completely intrinsically, or without external energy and without external coolers to below ambient temperatures. For example, the energy required for compression of $CO_2$ in carbon capture system 104 allows for the later expansion and cooling of $CO_2$ in expansion unit 162 to less than ambient temperature, and thus cooling energy is provided intrinsically in system 100 by compression of carbon capture system 104, as is the case of vapor compression refrigeration systems. Optionally, a compressed $CO_2$ stream can itself be cooled by an available heat sink to near ambient temperatures prior to expansion and temperature decrease to less than ambient temperature. The $CO_2$ in streams 156 and 110 for recycle in some embodiments is about 50 mol. % $CO_2$, is about 80 mol. % $CO_2$, in some embodiments is about 90 mol. % $CO_2$, and in some embodiments is about 95 mol. % $CO_2$. In some embodiments, after expansion unit 162, stream 110 is expanded to about ambient pressure, or about 1 bar. Inlet compressors such as inlet compressor 114 typically accept inlet air at or near about 1 bar. Standard gas turbine flue gas (exhaust) generally contains about 5 mol. % $CO_2$.

Figure 2:
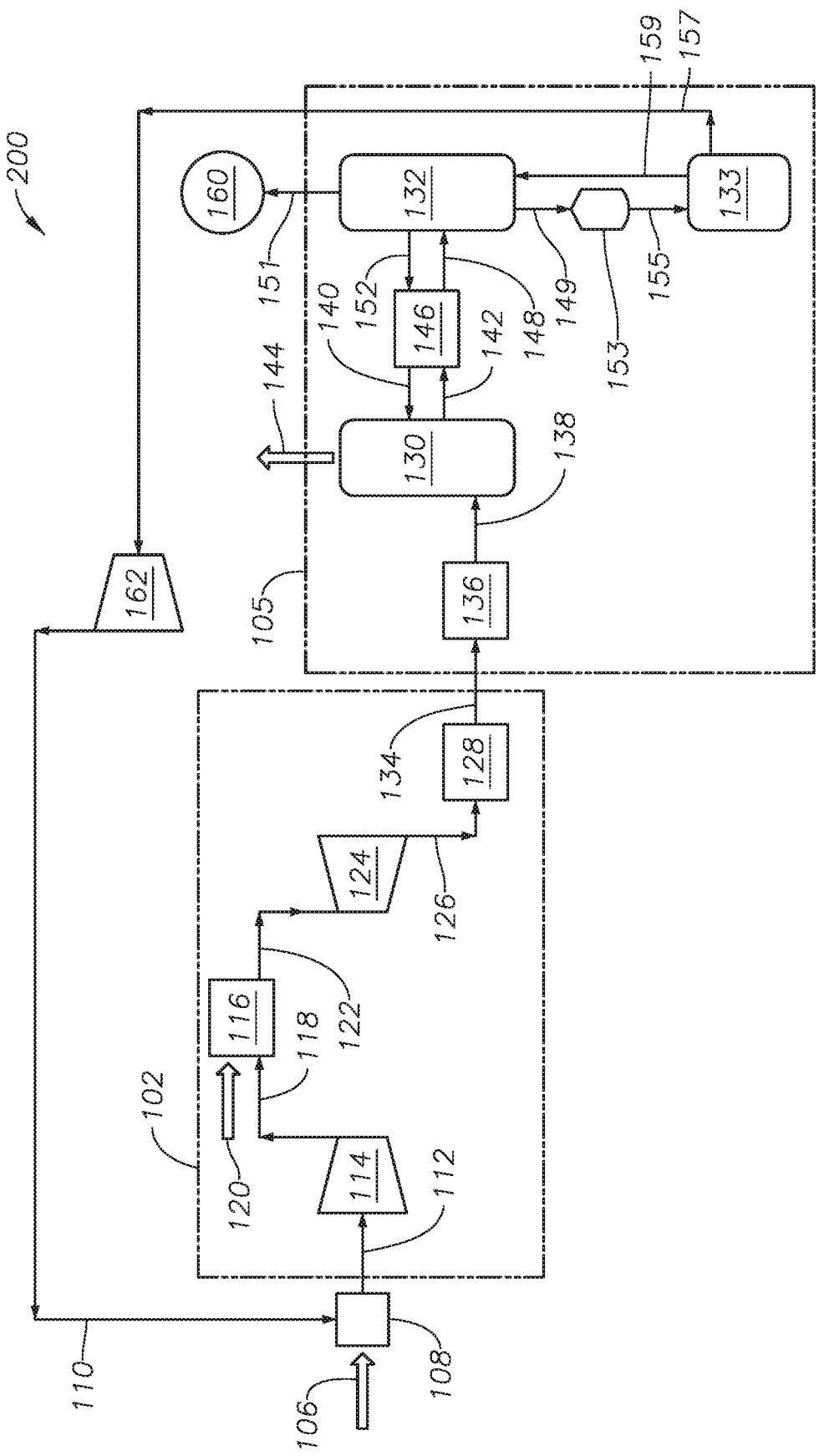
FIG. 2 is a schematic for a system exhibiting expanded, cooled fluid recycle to control inlet air temperature in a gas turbine, where the system includes a double column $CO_2$ absorption system.

FIG. 2 is a schematic for a system exhibiting expanded, cooled fluid recycle to control inlet air temperature in a gas turbine, where the system includes a double column $CO_2$ absorption system. Similarly labeled units are the same as those described with respect to FIG. 1. FIG. 2 shows an embodiment where regeneration of $CO_2$-capturing solvent is performed in two stages. Integrated turbine and carbon capture system 200 in FIG. 2 is similar system 100 in FIG. 1; however, carbon capture system 105 in FIG. 2 includes two $CO_2$ solvent regenerators 132, 133, for example regeneration columns or stripper columns.

In carbon capture system 105, $CO_2$ exiting $CO_2$ solvent regenerator 132 via stream 151 is directed directly to $CO_2$ dehydration and compression station 160. A slip stream of $CO_2$-rich solvent 149 is taken either or both from stream 148 or lower stages of $CO_2$ solvent regenerator 132, and stream 149 is further compressed by pump 153 to enter via stream 155 second $CO_2$ solvent regenerator 133, which operates at higher pressure than first $CO_2$ solvent regenerator 132. $CO_2$ is stripped from solvent at higher pressure in $CO_2$ solvent regenerator 133 and is conveyed via stream 157 to the expansion unit 162. Stream 157 can be subjected to further cooling if its temperature is higher than that required by expansion unit 162.

In one example, pressure in regenerator 132 is about 3 bar while the pressure in regenerator 133 can be up to about 10 bar, preferably up to about 7 bar. Pump 153 can be designed to compress the $CO_2$ rich solvent stream 149 from its pressure in line 148 or regenerator 132 to about the pressure of the regenerator 133.

In the embodiment of FIG. 2 where the $CO_2$ capture system is an amine-based solvent system, stream 157 can exit regenerator 133 at temperatures above about 130° C., and therefore can require cooling to near ambient temperature or the temperature of a cooling water source to allow for further cooling when expanded through expansion unit 162, such as a turbine or expansion valve for example.

Figure 3:
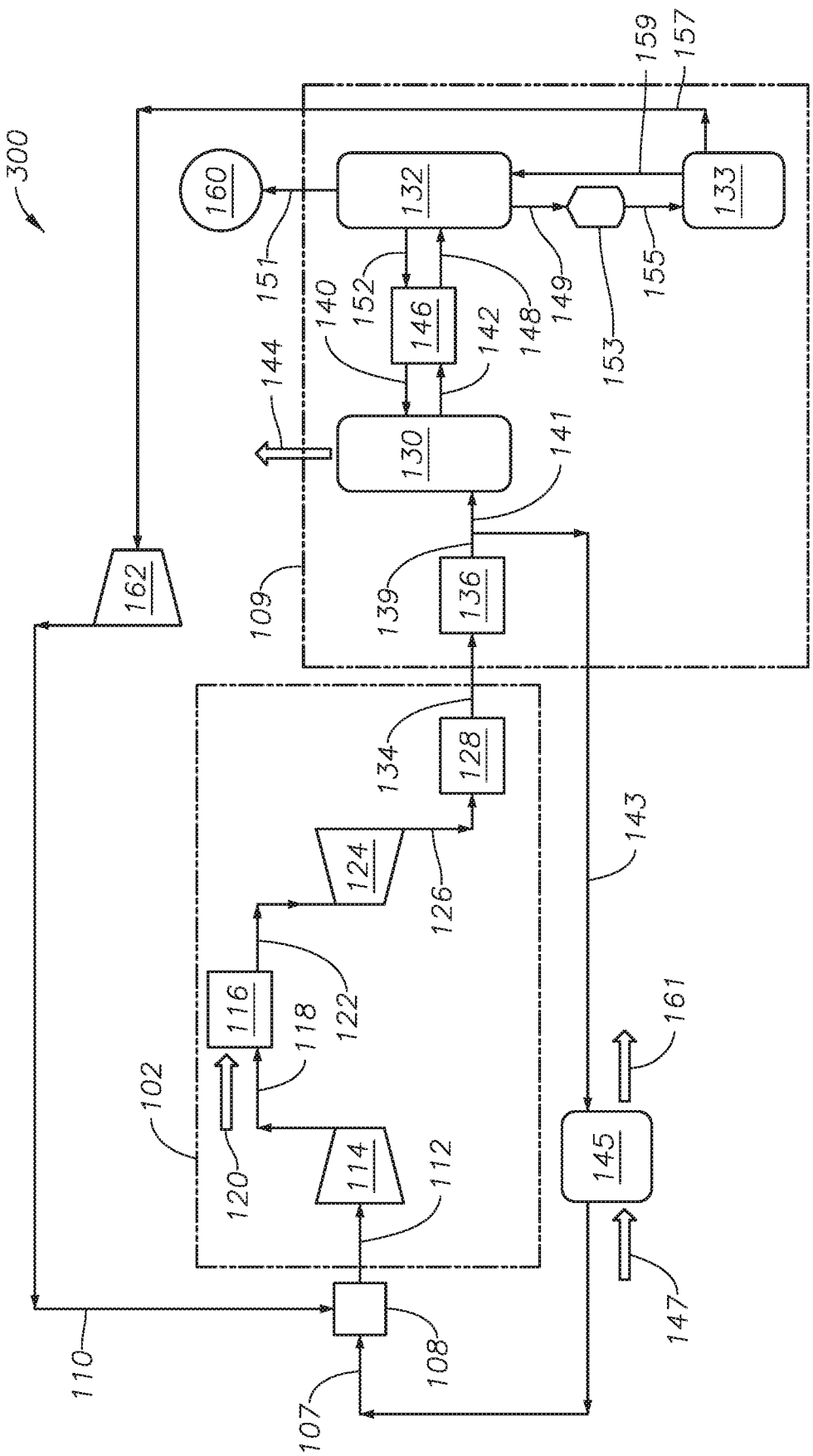
FIG. 3 is a schematic for a system exhibiting expanded, cooled fluid recycle to control inlet air temperature in a gas turbine, where the system includes a double column $CO_2$ absorption system and selective exhaust gas recirculation.

Greater pressure in $CO_2$ solvent regenerator 133 leads to greater pressure $CO_2$ in stream 157, and thus more work and more cooling is available as stream 157 passes through expansion unit 162. Stream 110 is conveyed back to heat exchange unit 108 to reduce the temperature of external air stream 106. Integrated turbine and carbon capture systems of FIGS. 1 and 2 can in other embodiments include selective exhaust gas recirculation, shown and described in more detail with respect to FIGS. 3 and 4. FIG. 3 shows a configuration with selective exhaust gas recirculation in parallel, and FIG. 4 shows a configuration in series.

In the system of FIG. 2, the recirculated $CO_2$ can be obtained at greater pressure with a lower energy penalty compared to other embodiments, requiring a lesser recirculation rate to achieve the same inlet air cooling. Carbon capture system 105 of FIG. 2 is controlled, in part, by varying the amount of solvent sent to $CO_2$ solvent regenerator 133 and by varying operating parameters of $CO_2$ solvent regenerator 133. The systems and methods described with respect to FIGS. 1 and 2 increase $CO_2$ concentration in exhaust gases and achieve certain benefits sought in systems applying selective exhaust gas recirculation. Stream 157 exits $CO_2$ solvent regenerator 133 at between about 1.5 bar and about 15 bar, or between about 3 bar and about 7 bar. Regenerated solvent stream 159 is returned from $CO_2$ solvent regenerator 133 to $CO_2$ solvent regenerator 132.

A lower energy penalty in the embodiment as presented in FIG. 2 derives in part from the usage of high pressure steam only to regenerate the $CO_2$ that is required for the recirculation in $CO_2$ solvent regenerator 133, while the bulk of the $CO_2$ is regenerated at lower pressure and would be requiring lower quality, lower pressure steam in solvent regenerator 132.

Figure 4:
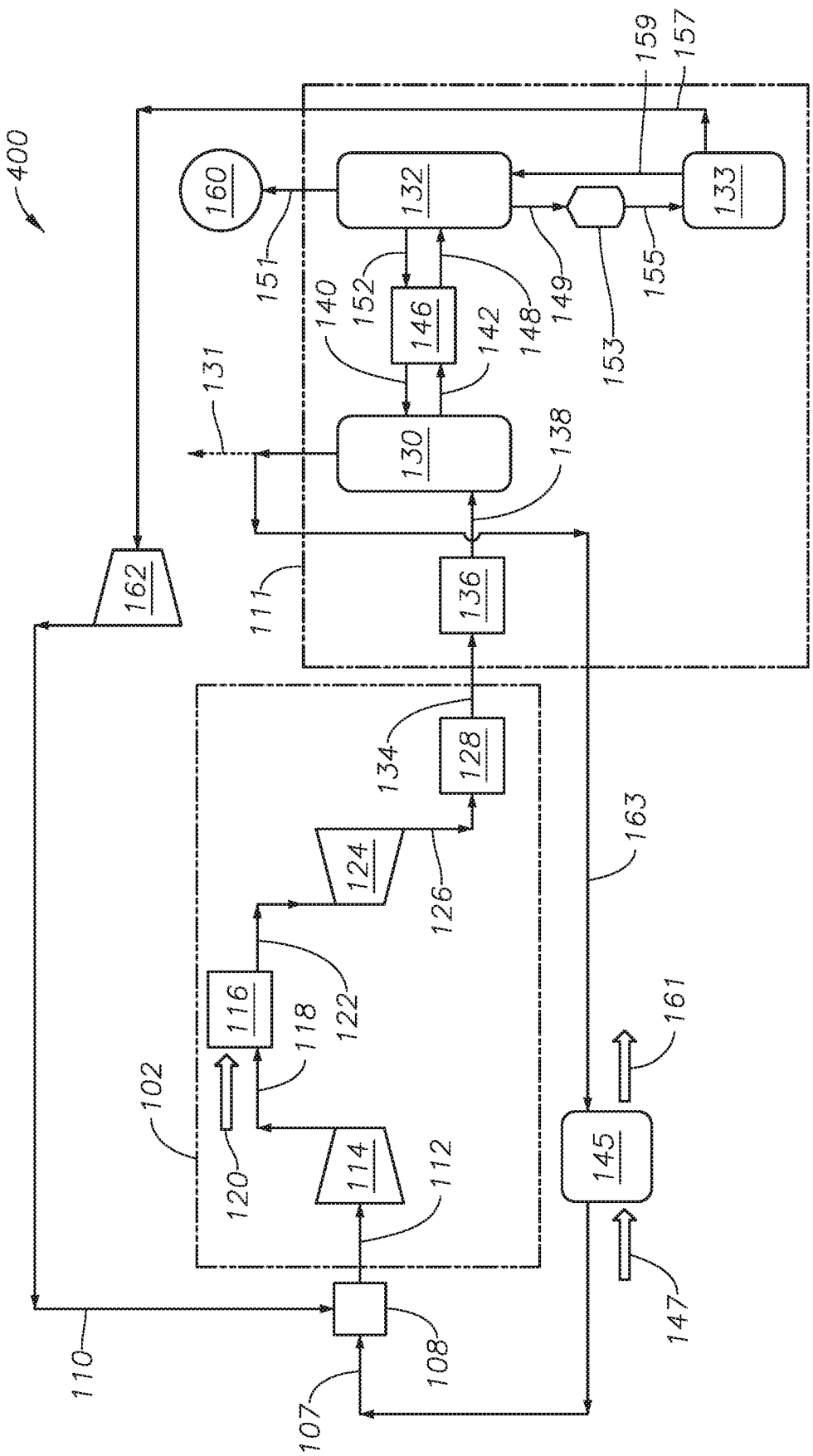
FIG. 4 is a schematic for a system exhibiting expanded, cooled fluid recycle to control inlet air temperature in a gas turbine, where the system includes a double column $CO_2$ absorption system and selective exhaust gas recirculation.

As noted, the integration of expanded, cooled $CO_2$ recycle with selective exhaust gas recirculation is possible and discussed in detail with respect to FIGS. 3 and 4. An expanded, cooled $CO_2$ recycle loop and a selective exhaust gas recirculation loop can be operated individually or simultaneously to optimize system performance and meet load demand on an electricity grid. For example, a system can operate a cooled, expanded $CO_2$ recycle loop at greater ambient temperatures (summer), such as temperatures above about 20° C. or 30° C., and the selective exhaust gas recirculation at lesser ambient temperature (winter), below about 20° C.

FIG. 3 is a schematic for a system exhibiting expanded, cooled fluid recycle to control inlet air temperature in a gas turbine, where the system includes a double column $CO_2$ absorption system and selective exhaust gas recirculation. The system of FIG. 3 is similar to that of FIGS. 1 and 2, and similarly labeled units represent the same units as in previous figures. In carbon capture system 109 of integrated turbine and carbon capture system 300, stream 139 exiting exhaust conditioning unit 136 is split into stream 141 and stream 143. Stream 141 is fed to absorption tower 130 to follow the same operating schematic of carbon capture system 105 in FIG. 2.

Stream 143 is fed to a selective $CO_2$ transfer unit 145 which transfers exhaust $CO_2$ from stream 143 to the external air stream 147 resulting in a $CO_2$-rich inlet air stream 107 feeding heat exchange unit 108. $CO_2$ transfer unit 145 vents $CO_2$-lean exhaust and air via stream 161.

Selective $CO_2$ transfer unit 145 could be a set of membranes permeable to $CO_2$ or other devices and systems where $CO_2$ transfer occurs indirectly through the usage of an intermediate media as for example an adsorption or absorption system.

FIG. 4 is a schematic for a system exhibiting expanded, cooled fluid recycle to control inlet air temperature in a gas turbine, where the system includes a double column $CO_2$ absorption system and selective exhaust gas recirculation. Integrated turbine and carbon capture system 400 includes carbon capture system 111, and stream 163 exiting absorption tower 130 is fed to a selective $CO_2$ transfer unit 145 which transfers exhaust $CO_2$ from stream 163 to the external air stream 147 resulting in a $CO_2$-rich inlet air stream 107 feeding heat exchange unit 108. In some embodiments, a portion of the flue gases are recycled to the air compressor inlet via stream 163 while the remaining portion of the flue gases exit the system through the stack via stream 131. $CO_2$ transfer unit 145 vents $CO_2$-lean exhaust and air via stream 161. In such a configuration, the carbon capture system 111 is designed and operated to increase $CO_2$ in stream 163 leaving the absorption tower 130 to allow for $CO_2$ transfer in the $CO_2$ transfer unit 145. In certain embodiments of the present disclosure, expanded, cooled recycle streams comprising concentrated $CO_2$ are used to cool turbine inlet air in the absence of or without selective exhaust gas recycle.

By allowing selective exhaust gas recycle to operate in parallel with a cold $CO_2$ recycle loop, systems can reduce energy requirements by maintaining a specific concentration of $CO_2$ in the inlet stream to a turbine compressor thereby controlling emissions when the inlet air temperature is at intermediate levels. In some instances, energy requirements for the cold $CO_2$ recycle might be more than the energy requirements for the selective exhaust gas recirculation. Having both systems available allows for optimization of energy use of the system.

The singular forms "a," "an," and "the" include plural referents, unless the context clearly dictates otherwise.

The term "about" when used with respect to a value and/or range refers to values including plus and minus 5% of the given value and/or range.

In the drawings and specification, there have been disclosed embodiments of apparatus, systems, and methods for expanded, cooled fluid recycle, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for increasing power from or efficiency of combustion in a turbine, the method comprising the steps of:
concentrating $CO_2$ in a $CO_2$ capture system to produce a concentrated $CO_2$ stream;
operating a controller to regulate an amount of the concentrated $CO_2$ stream to form a pressurized fluid stream;
expanding in an expansion unit the pressurized fluid stream to form an expanded, cooled fluid stream;
exchanging heat between an oxygen containing stream and the expanded, cooled fluid stream to reduce temperature of the oxygen containing stream to a reduced temperature and create a reduced temperature turbine compressor inlet oxygen containing stream; and
compressing the reduced temperature turbine compressor inlet oxygen containing stream to an operating pressure of the turbine, where the step of compressing the reduced temperature turbine compressor inlet oxygen containing stream is more efficient than compressing the oxygen containing stream, where the expanded, cooled fluid stream is at least about 90 mol. % $CO_2$ and is at about 1 bar pressure, and where the controller regulates the amount of the concentrated $CO_2$ stream to form the pressurized fluid stream to optimize operation of the turbine depending on ambient temperature of the oxygen containing stream.

2. The method according to claim 1, further comprising the step of combusting a fuel in a combustion chamber of the turbine using the reduced temperature turbine compressor inlet oxygen containing stream, where the step of combusting the fuel with the reduced temperature turbine compressor inlet oxygen containing stream is more efficient than combusting the fuel in the combustion chamber with the oxygen containing stream.

3. The method according to claim 2, where emissions, including nitrogen oxides emissions, of the turbine are reduced compared to combusting the fuel in the combustion chamber with the oxygen containing stream.

4. The method according to claim 2, further comprising the step of applying selective exhaust gas recirculation to at least a portion of exhaust gas produced from the step of combusting the fuel in the combustion chamber of the turbine to recirculate exhaust gas to the oxygen containing stream.

5. The method according to claim 4, where the step of exchanging heat between the oxygen containing stream and the expanded, cooled fluid stream and the step of applying selective exhaust gas recirculation to exhaust gas are performed simultaneously.

6. The method according to claim 1, where the oxygen containing stream comprises air.

7. The method according to claim 1, where the oxygen containing stream comprises an oxygen enriched stream produced from an air separation unit.

8. The method according to claim 1, where the expansion unit comprises a turbine.

9. The method according to claim 1, where compressed $CO_2$ in the pressurized fluid stream is provided from a carbon capture process capturing carbon dioxide produced in a step of combusting a fuel in a combustion chamber of the turbine.

10. The method according to claim 9, where the compressed $CO_2$ is cooled before the step of expanding in the expansion unit.

11. The method according to claim 1, where compressed $CO_2$ in the pressurized fluid stream is provided from a source selected from a group comprising: a carbon capture process capturing carbon dioxide produced in a step of combusting a fuel in a combustion chamber of the turbine; a hydrocarbon-bearing reservoir; a natural gas treatment plant; a $CO_2$ capture plant comprising $CO_2$ from combustion products; a $CO_2$ capture plant comprising $CO_2$ from air; an industrial process providing $CO_2$ byproduct; or a combination of any of the foregoing.

12. The method according to claim 1, where the step of exchanging heat between the oxygen containing stream and the expanded, cooled fluid stream is carried out with direct mixing between the oxygen containing stream and the expanded, cooled fluid stream.

13. The method according to claim 1, where the step of exchanging heat between the oxygen containing stream and the expanded, cooled fluid stream is carried out with indirect heat exchange between the oxygen containing stream and the expanded, cooled fluid stream.

14. The method according to claim 1, where the oxygen containing stream is between about 30° C. and about 60° C., the reduced temperature turbine compressor inlet oxygen containing stream is between about 5° C. and about 45° C., and where oxygen level in the reduced temperature turbine compressor inlet oxygen containing stream is maintained at least at about 15 mol. %.

15. The method according to claim 1, further comprising the step of increasing a volume amount of the expanded, cooled fluid stream based on temperature of the oxygen containing stream.

16. The method according to claim 1, further comprising the step of decreasing a volume amount of the expanded, cooled fluid stream based on temperature of the oxygen containing stream.

* * * * *